March 23, 1965   R. H. PINTELL   3,175,160
CONTROLLED CURRENT SOURCE

Filed March 15, 1962   3 Sheets-Sheet 1

INVENTOR:
ROBERT H. PINTELL
BY
Karl F. Ross
AGENT

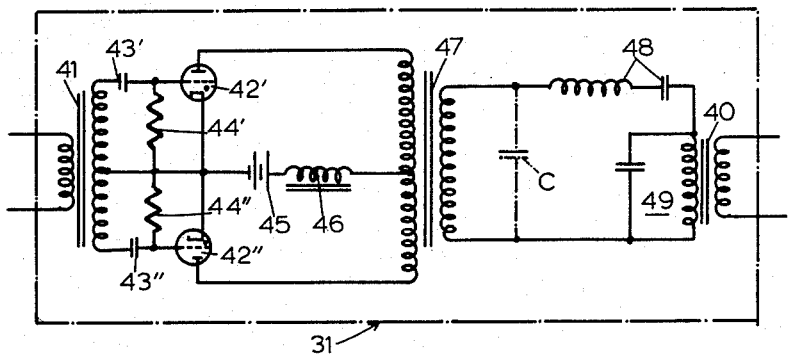
FIG.4
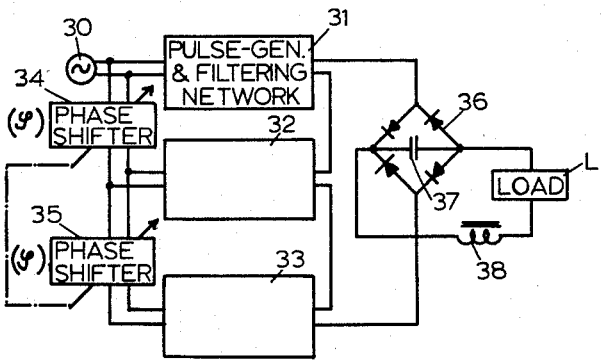
FIG.3
FIG.6
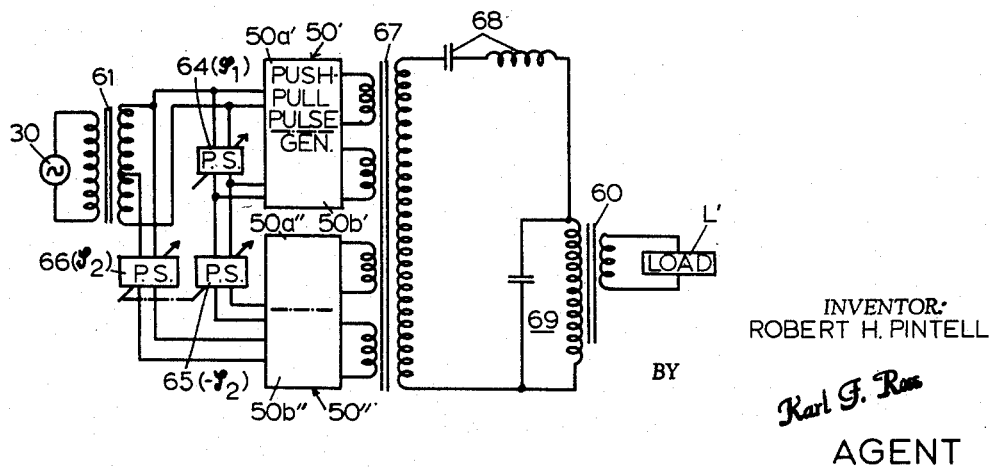
INVENTOR:
ROBERT H. PINTELL
BY
Karl G. Ross
AGENT

United States Patent Office 3,175,160
Patented Mar. 23, 1965

3,175,160
CONTROLLED CURRENT SOURCE
Robert H. Pintell, Bronx, N.Y., assignor to Intron International, Inc., Bronx, N.Y., a corporation of New York
Filed Mar. 15, 1962, Ser. No. 179,864
9 Claims. (Cl. 328—167)

My present invention relates to a generator of alternating or direct current having an adjustable output.

An object of this invention is to provide means in such generator for varying its output, in accordance with load requirements, in a virtually lossless manner, i.e. without the use of dissipative resistances.

A more particular object of this invention is to provide a controllable source of simple or composite rectangular pulses of predetermined frequency and variable length, these pulses being convertible into either a sinusoidal or a rectified current of a magnitude varying with pulse length.

In my copending application Ser. No. 120,787, filed June 29, 1961, now Patent No. 3,088,075 issued April 3, 1963, I have disclosed a stepped-wave generator for the production or a signal-controlled or stabilized output including a pair of electric breakdown devices of the three-electrode type, such as gas thyratrons, ignitrons, controlled rectifiers or four-layer diodes, which are connected in push-pull for periodic alternate triggering and quenching at adjustable intervals whereby each device passes a rectangular pulse whose duration can be varied within the limits of a half-cycle of an applied operating frequency for producing a load of selected magnitude. While such a system operates generally satisfactorily, the need for periodically interrupting the flow of output current to quench the momentarily conductive device poses problems of circuitry and involves the expenditure of relatively large amounts of switching energy.

It is, accordingly, another object of my instant invention to provide an improvement over the pulse-generating system of my aforementioned application in which these drawbacks are avoided.

Broadly speaking, my invention contemplates the provision of means for combining two or more balanced waves of like frequency and preferably the same amplitude but different phase, derived from a common source with the aid of suitable phase-shifting means, the extent of the relative phase displacement determining the amplitude of the resultant oscillation. The use of stepped-wave generators between the several input circuits, carrying the relatively phase-displaced currents, and the load enables the application of this principle to situations in which the available current source produces a discontinuous or otherwise harmonically enriched periodic signal which it is desired to convert into a pure sine wave.

In accordance with a feature of my invention I provide a plurality of stepped-wave generators of identical frequency, triggered by a common source of periodic signals controlling the output frequency by their cadence, in combination with means for relatively shifting the phase of their respective outputs and superimposing these outputs upon one another with preferably identical amplitudes whereby in-phase portions of the respective wave steps will give rise to distinct pulses whereas phase-opposed portions will cancel in whole or in part, the length of the pulses thus depending upon the extent of the relative phase displacement. More specifically, the several generators may have their input signals staggered with the aid of one or more phase shifters, preferably in such manner that the resulting pulse train is symmetrical and free from even-order harmonics; for this purpose the several phase shifters, in a system having more than two generators, should be co-ordinated to introduce like phase displacements between three or more individual generators of equal-amplitude outputs or between corresponding generators of several equal-amplitude pairs. The use of more than two generators, especially under the conditions just described, has the effect of giving rise to composite pulses which much more nearly approximate a sine wave so that the elimination of undesired harmonics is facilitated. Such elimination of harmonics, advantageously, is effected by means of resonant networks of the type disclosed in my copending application Ser. No. 738,585 filed May 28, 1958, now Patent No. 2,968,738 issued January 17, 1961, particularly as modified in accordance with the disclosure of my copending application Ser. No. 117,168, filed June 14, 1961, to insure alternate triggering and extinction of two push-pull-connected breakdown devices (e.g. thyratrons or controlled rectifiers) by an arrangement which can be described as resonant commutation.

The invention will be described in greater detail with reference to the accompanying drawing in which:

FIG. 3 is a diagrammatic representation of a circuit arrangement for producing the pulse trains illustrated in FIGS. 1 and 2;

FIG. 4 is a circuit diagram showing details of a generator network representative of any of several such networks included in the system of FIG. 3;

FIG. 6 is a circuit diagram of an alternate system incorporating networks of the type shown in FIG. 5.

Figure 1:
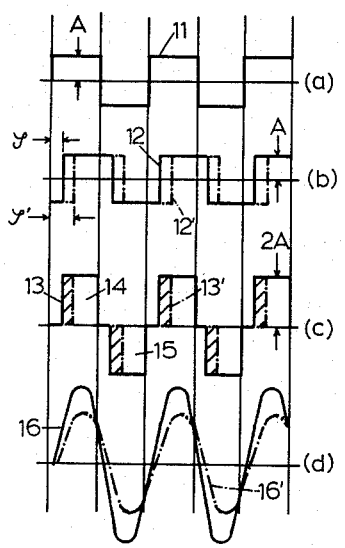
FIGS. 1 and 2 are two sets of graphs useful in explaining the principles of my invention.

I shall first refer to FIG. 1 in which graphs (a) and (b) shows two symmetrically stepped waves 11, 12 of like amplitude A and identical frequency but relatively displaced by a phase angle $\varphi$. A composite wave 13, graph (c), results from the superposition of the two waves 11, 12 and consists of discrete rectangular pulses 14, 15 of amplitude 2A separated by an interval equal to $\varphi$. It will be noted that all the waves shown in FIG. 1 (as well as in subsequent figures) are balanced, i.e. their positive and negative half-cycles are of equal amplitude and duration.

If the angle $\varphi$ is changed to $\varphi'$ by a shift in the phase of wave 12 relative to wave 11, as indicated in dot-dash lines at 12' in FIG. 1(b), the resultant stepped wave 13' of graph (c) consists of pulses of the same amplitude as before but altered width corresponding to their modified spacing $\varphi'$. In the particular example illustrated, $\varphi'$ exceeds $\varphi$ so that the pulse width of wave 13' is less than that of wave 13. Upon the elimination of higher harmonics, wave 13 yields a sinusoidal wave 16, FIG. 1(d), whose amplitude is greater than that of the corresponding wave 16' derived from wave 13'; the difference in the amplitudes of waves 16, 16' is of course, due to the difference in pulse width of waves 13, 13'. It will be observed that waves 13, 13', 16 and 16' all have the same fundamental frequency as the original stepped waves 11 and 12, 12'.

Figure 2:
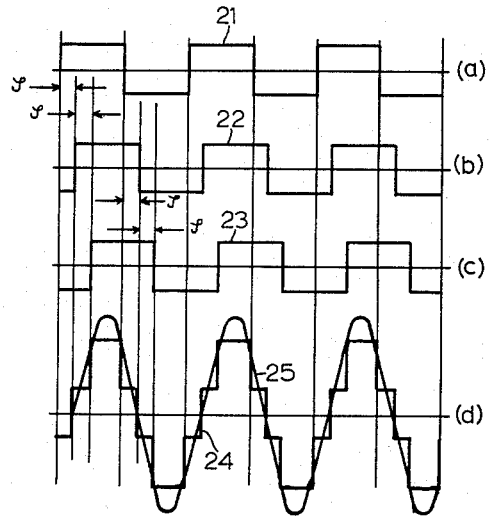

In FIG. 2 I have shown a set of three stepped waves 21, 22 and 23, graphs (a), (b) and (c), which combine into a composite stepped wave 24, graph (d). Wave 24 approximates more closely its fundamental 25, into which it can be converted by suitable filtering, than does the wave 13 or 13' of FIG. 1. In order to maintain the symmetry of wave 24 and to suppress all even-order harmonics therein, I provide the same phase shift $\varphi$ between waves 21, 22 as between waves 22, 23. Again, as with the two-wave system of FIG. 1, the pulse width of the resultant wave 24 can be changed, and with it the amplitude of filtered wave 25, through variation of phase angle $\varphi$.

FIG. 3 shows a circuit arrangement for producing the waves 16, 25 of FIGS. 1 and 2 and converting them into direct current of adjustable magnitude. A wave source 30, assumed to have an output rich in undesirable harmonics, works into three pulse-generating and filtering networks 31, 32 and 33. (If the output of source 30 were a pure sine wave, there would be no need for the networks 31–33.) Network 31 is connected directly to source 30 whereas network 32 is supplied from that source through a phase shifter 34, the latter being ganged with a similar phase shifter 35 inserted between the inputs of networks 32 and 33. With both phase shifters 34, 35 introducing like displacements $\varphi$ between the inputs and, consequently, the outputs of the several networks 31–33, these outputs can be combined and filtered to yield an output of the wave shape 25 or, if network 33 and phase shifter 35 were omitted, of the wave shape 16. If desired, this output may be rectified in a bridge 36 and filtered by a condenser 37 and a choke 38 before being fed to a D.-C. load L.

FIG. 4 illustrates a network 31 representative of any of the networks 31–33 of FIG. 3. It comprises an input transformer 41 working into two push-pull-connected electronic breakdown devices of the three-electrode type, here shown as thyratrons 42', 42" which are alternately energized in the rhythm of the input frequency by the two halves of the secondary winding of the transformer connected across their grid-cathode circuits via respective coupling condensers 43', 43" and input resistors 44', 44". A source of direct current, shown as a battery 45, energizes the thyratrons 42', 42" in series with a choke 46 and respective halves of the primary winding of a coupling transformer 47. The secondary of transformer 47 delivers its output to a filter circuit composed of a series-resonant circuit 48 and a parallel-resonant circuit 49 connected in cascade, the inductive branch of the latter circuit constituting the primary of an output transformer 40. With circuit 49 tuned to resonance substantially at the input frequency (generator 30, FIG. 3), and with circuit 48 resonating at a somewhat higher frequency (e.g. 5% to 35% above that of circuit 49 as disclosed in my concurrently filed application entitled "Sine-Wave Generator," Ser. No. 179,866), the circuit 48, 49 will exhibit a capacitive reactance as indicated symbolically at C; this reactance produces in the primary circuit of transformer 47 a back voltage which quenches each thyratron 42', 42" half a cycle after it has been triggered into conductive condition, i.e. concurrently with the triggering of the other thyratron.

Figure 5:
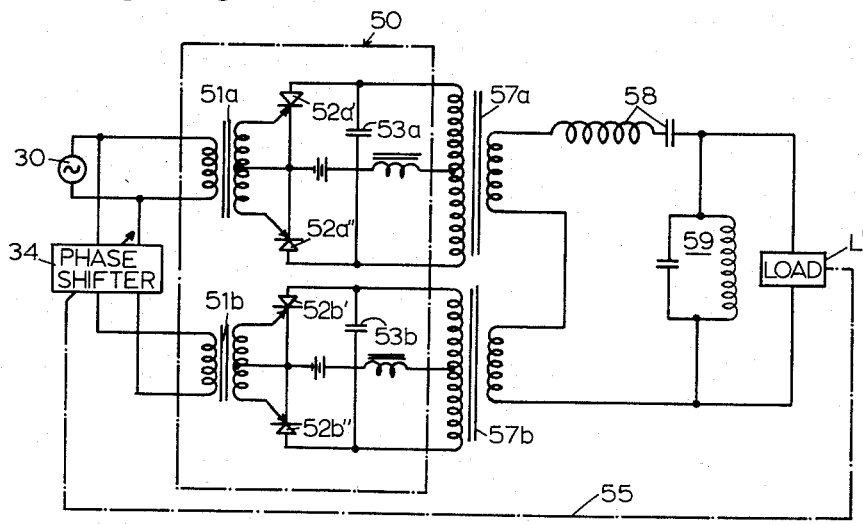
FIG. 5 is a circuit diagram illustrating a modified generator network.

Since the output of transformer 40 is substantially a pure sine wave, it will be apparent that the system of FIG. 3 produces the sinusoidal oscillation 16 or 25 (FIGS. 1 and 2) directly, i.e. without the intermediary of a stepped composite wave as shown at 13, 13' and 24, through the combination of two or three sine waves of identical frequency and different phase. This, however, necessitates the use of a separate filtering circuit for each pulse-generating network. FIG. 5 shows how a single filtering circuit can be used for the stepped-wave outputs of a plurality of such pulse generators.

The network 50 of FIG. 5 comprises two input transformers 51a, 51b fed from source 30, with interposition of a phase shifter 34, as described in connection with the system of FIG. 3. The secondaries of transformers 51a, 51b are connected in push-pull across the inputs of respective pairs of electronic breakdown devices, here shown as controlled rectifiers 52a', 52a" and 52b', 52b", in essentially the same manner as is true of transformer 41 and thyratrons 42', 42" in FIG. 4. The anodes of each rectifier pair are bridged by the primary winding of a respective coupling transformer 57a, 57b shunted by a commutating condenser 53a, 53b. The secondaries of these transformers are connected in series across filtering circuit of the type described above, consisting of a series-resonant circuit 58 in cascade with a parallel-resonant circuit 59. With proper relative dimensioning of the two resonant circuits, as hereinbefore explained, the commutating condensers 53a, 53b may be omitted. An alternating-current load L' is connected across the circuit 59.

The voltage impressed upon the filtering circuit 58, 59 is a stepped wave shown in graph (c) of FIG. 1. Circuit 59 is tuned to substantially the fundamental frequency of this wave, taking into account any load reactances effectively forming part of this circuit. The load current has the sinusoidal shape of wave 16 or 16'. Naturally, this current could also be rectified before being fed to a D.-C. load as shown in FIG. 3. As illustrated schematically in FIG. 5, the adjustable phase shifter may be controlled by a feedback connection 55 in order to stabilize the output of the system by compensating for changes in load voltage or current from a predetermined reference value.

FIG. 6 illustrates a combination of two pulse-generating networks 50', 50", as shown in FIG. 5, working into a common coupling transformer 67. The secondary circuit of this transformer includes again a single series-tuned circuit 68 in cascade with a single parallel-tuned circuit 69, the inductive branch of the latter constituting the primary of an output transformer 60 feeding a load L'. The networks 50', 50" are energized from source via an input transformer 61 which works directly into the upper half 50b' of network 50' and energizes the lower half 50a' of that network as well as the two halves 50a", 50b" of network 50" via respective phase shifters 64, 65, 66. Phase shifter 64 produces a shift $\varphi_1$, whereas phase shifters 65 and 66, ganged together, produce complementary shifts $\varphi_2$ and $-\varphi_2$, respectively. The place shifters 64–66, as also those of the preceding figures, may be controlled manually, by low-frequency input signals, or by feedback as described in connection with FIG. 5.

Figure 7:
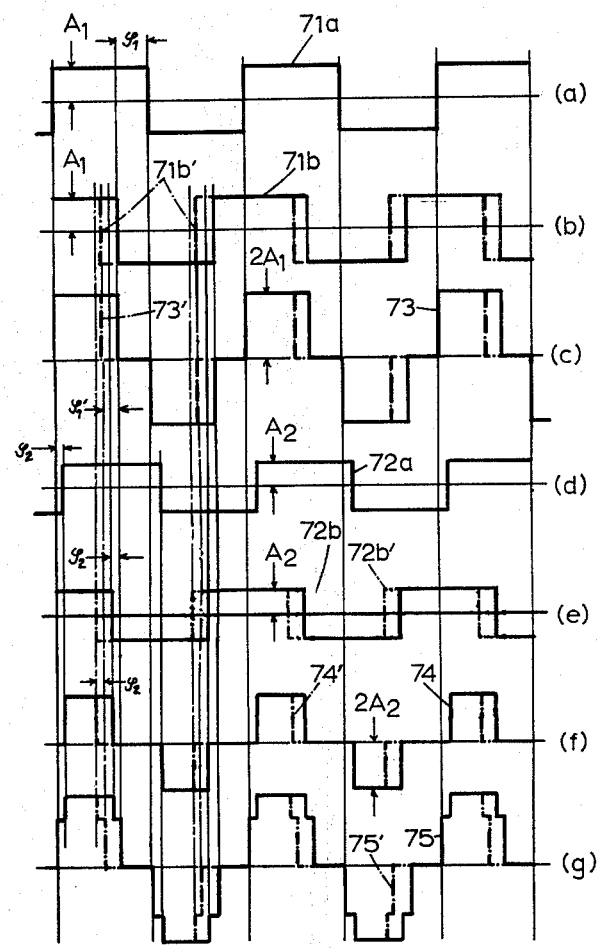
FIG. 7 is a set of graphs pertaining to the system of FIG. 6.

The operation of the system of FIG. 6 has been illustrated in FIG. 7. Graphs (a) and (b) of that figure show stepped waves 71a and 71b of amplitude $A_1$ produced, respectively, by the network sections 50a' and 50b' with a relative phase shift $\varphi_1$, due to device 64. FIG. 7(c) shows the resultant stepped wave 73 as well as a similar wave 73' resulting from an additional shift $\varphi_1'$ given to the wave 71b of FIG. 7(b), through adjustment of shifter 64, to produce the wave 71b'. Graphs (d) and (e) of FIG. 7 show similar stepped waves 72a, 72b and 72b', of amplitude $A_2$, produced by the network sections 50a" and 50b", respectively; owing to devices 65 and 66, the trailing edges of waves 72b, 72b' precede the corresponding edges of waves 71b, 71b' by the same phase angle $\varphi_2$ by which the leading edge of wave 72a follows that of wave 71a. Graph 7(f) shows the composite 74 or 74' of the waves 72a, 72b or 72a, 72b'. The combination of both waves 73 and 74 (or 73' and 74') results in the final stepped wave 75 (or 75') shown in FIG. 7(g). It will be noted that the last-mentioned wave is again symmetrical and free from even-numbered harmonics, being thus easily convertible into a sine wave by the circuit 68, 69.

I claim:

1. A generator of controlled alternating current, comprising a source of periodic electric signals, means including at least one adjustable phase shifter connected to said source for producing a plurality of balanced oscillations of like frequency but different phases, circuit means for combining said oscillations into a single balanced wave of an amplitude depending upon the phase difference between said oscillations, and control means for said phase shifter coupled with said circuit means for adjusting said phase difference in a manner compensating for changes in the amplitude of said wave.

2. A generator of controlled alternating current, comprising a source of periodic electric signals, a plurality of switching networks triggerable by said signals for producing symmetrically stepped waves at the cadence of said signals, means including at least one adjustable phase shifter for applying said signals to said networks with relatively staggered phases, thereby giving rise to a plurality of differently phased symmetrically stepped oscillations of like frequency and substantially the same amplitude, circuit means for combining said oscillations into an output wave of an amplitude depending upon the phase difference between said oscillations, and control means for said phase shifter coupled with said circuit means for adjusting said phase difference in a manner compensating for changes in the amplitude of said output wave.

3. A generator of controlled alternating current, comprising a source of periodic electric signals, a plurality of switching networks triggerable by said signals for producing symmetrically stepped waves at the cadence of said signals, means including at least one adjustable phase shifter for applying said signals to said networks with relatively staggered phases, thereby giving rise to a plurality of differently phased symmetrically stepped oscillations of like frequency and substantially the same amplitude, circuit means including filtering means for combining said oscillations into a sinusoidal output wave of an amplitude depending upon the phase difference between said oscillations, and control means for said phase shifter adapted to vary said phase difference.

4. The combination according to claim 3 wherein said filtering means includes an individual filter circuit for the output of each of said networks, said circuit means further including means for combining the outputs of said filter circuits.

5. The combination according to claim 3 wherein said circuit means includes means for combining the individual outputs of said networks into a single stepped wave, said filtering means including a single filter circuit for converting said single stepped wave into said sinusoidal output wave.

6. The combination according to claim 3 wherein each of said networks includes a pair of push-pull-connected electronic switching devices alternately triggerable by said switching means into a conductive condition and quenching means for periodically restoring said devices to a nonconductive condition.

7. The combination according to claim 6 wherein said quenching means comprises a filter circuit included in said circuit means, said filter circuit including cascade-connected series-tuned and parallel-tuned circuits constituting a capacitive reactance in the output of said switching devices.

8. A generator of controlled alternating current, comprising a source of periodic electric signals, a plurality of switching networks triggerable by said signals for producing symmetrically stepped waves at the cadence of said signals, means including at least one adjustable phase shifter for applying said signals to said networks with relatively staggered phases, thereby giving rise to a plurality of differently phased symmetrically stepped oscillations of like frequency and substantially the same amplitude, circuit means including filtering means for combining said oscillations into a sinusoidal output wave of an amplitude depending upon the phase difference between said oscillations, and control means for said phase shifter coupled with said circuit means for adjusting said phase difference in a manner compensating for changes in the amplitude of said output wave.

9. A generator of controlled alternating current, comprising a source of periodic electric signals, a plurality of switching networks triggerable by said signals for producing symmetrically stepped waves of substantially identical amplitudes at the cadence of said signals, means including at least one phase shifter for applying said signals to said networks with relatively staggered phases, thereby giving rise to a plurality of differently phased symmetrically stepped oscillations of like frequency and substantially the same amplitude, circuit means for combining said oscillations into an output wave of an amplitude depending upon the phase difference between said oscillations, and control means for said phase shifter adapted to vary said phase difference.

References Cited in the file of this patent

UNITED STATES PATENTS

| | | |
|---|---|---|
| 2,468,059 | Grieg | Apr. 26, 1949 |
| 2,562,694 | Brown | July 31, 1951 |